United States Patent

Hummer

[15] 3,661,398

[45] May 9, 1972

[54] SANITARY SEAL

[72] Inventor: Herbert B. Hummer, Kalamazoo, Mich.

[73] Assignee: Durametallic Corporation, Kalamazoo, Mich.

[22] Filed: Sept. 21, 1970

[21] Appl. No.: 73,721

[52] U.S. Cl. .................................277/74, 277/87, 277/93 R
[51] Int. Cl..................F16j 15/30, F16j 15/38, F16j 15/40
[58] Field of Search......................277/74, 75, 79, 40, 41, 87, 277/93 SD, 93 R

[56] References Cited

UNITED STATES PATENTS

| | | | |
|---|---|---|---|
| 3,218,085 | 11/1965 | Grace | 277/74 X |
| 3,467,396 | 9/1969 | Hershey | 277/74 |

*Primary Examiner*—Robert G. Nilson
*Attorney*—Woodhams, Blanchard and Flynn

[57] ABSTRACT

An improved cartridge-type seal construction, particularly for use under conditions requiring a high level of sanitation, same having an annular insert fixedly secured to a housing and an annular seal ring nonrotatably secured relative to a shaft. The seal ring is nonrotatably connected to a collar by means of headed drive pins which prevent the collar and seal ring from being axially separated. A spring is confined within and coacts between the collar and the seal ring for resiliently urging the seal ring into abutting, sealing engagement with a mating face on the insert. The corners and recesses on the seal ring and insert are preferably provided with rounded, substantially smooth contours for preventing collection of bacteria or other contaminating material. The collar and seal ring, together with the spring confined therebetween, are removable from the shaft as a unit to facilitate assembly or disassembly of the seal construction. The insert and seal ring surround and cooperate with the shaft so as to define an internal chamber, which chamber communicates with the interface area between the abutting seal faces and is connected to a supply of cleaning fluid, particularly steam, whereupon the cleaning fluid supplied to the chamber flows radially outwardly between the abutting seal faces for cleaning same.

10 Claims, 4 Drawing Figures

PATENTED MAY 9 1972
3,661,398
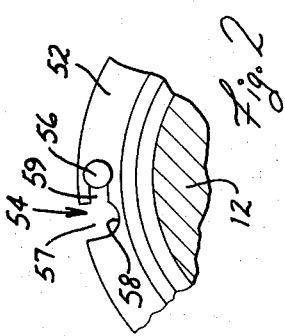
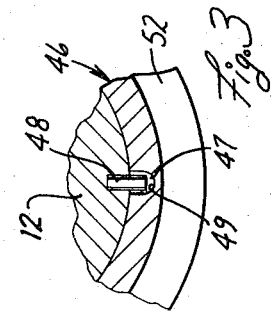
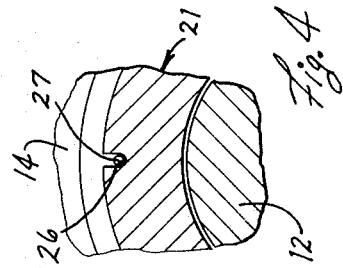
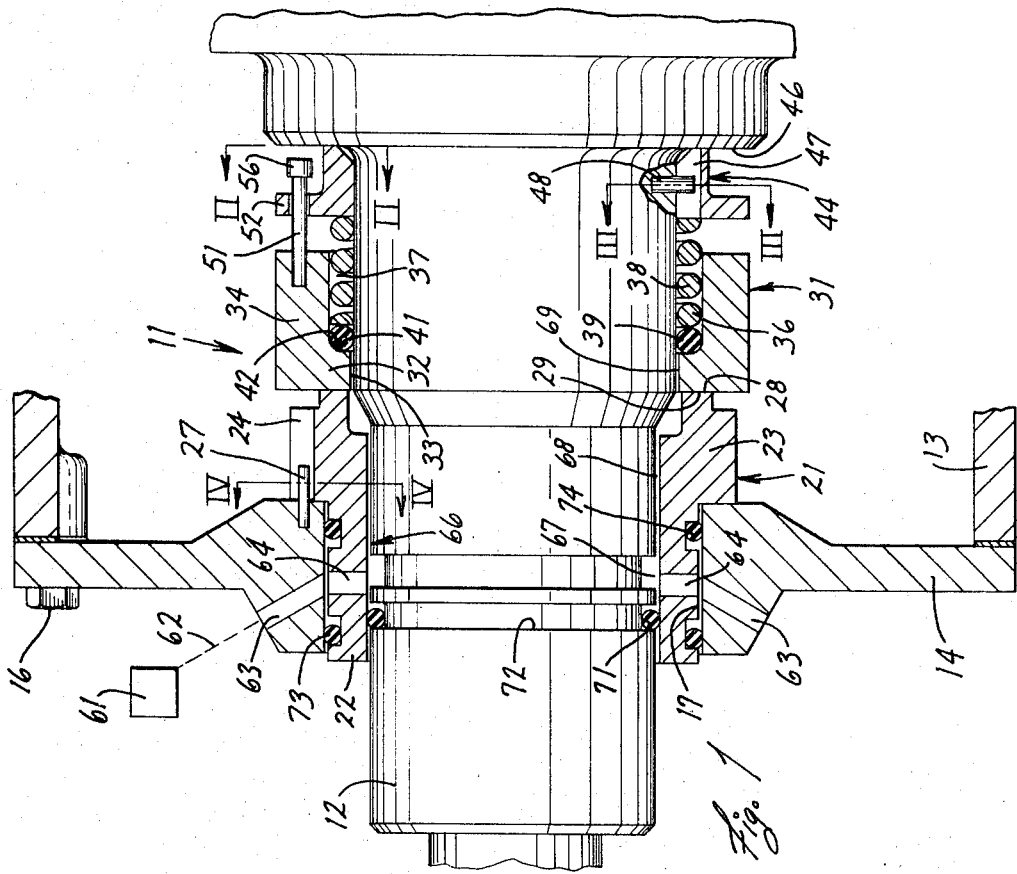
INVENTOR
HERBERT B. HUMMER
BY
Woodhams, Blanchard & Flynn
ATTORNEYS

SANITARY SEAL

FIELD OF THE INVENTION

This invention relates to an improved seal assembly and, in particular, relates to a cartridge-type seal assembly which can be easily disassembled for cleaning, and which is designed to minimize collection or entrapment of contaminating materials or bacteria, either between the seal faces or elsewhere.

BACKGROUND OF THE INVENTION

Seal assemblies utilized on food processing equipment and the like generally require that the equipment be periodically shut down to enable the parts thereof, including the seal assemblies, to be disassembled and cleaned so as to remove any collected material or bacteria which may be trapped therewithin. Thus, insofar as the seal is concerned, there has long existed a need for a sanitary type seal assembly which can be successfully operated for substantially long periods of time without collecting contaminating materials or bacteria. Further, there has long existed a need for a sanitary seal assembly which, when the machine is shut down for cleaning purposes, can be easily and quickly disassembled, cleaned, and reassembled so as to minimize both the maintenance involved and the machine shutdown time.

While various types of seal assemblies have been designed for use as sanitary seals, none of these prior seal constructions have, to the best of my knowledge, overcome the two primary problems referred to above, which two primary problems may be restated as (1) the provision of a seal assembly which is designed to minimize the collection or retention of material or bacteria which can cause bacterial growth or contamination, and (2) the provision of a seal assembly which can be easily and quickly disassembled, cleaned and reassembled so as to substantially minimize maintenance and equipment shutdown time.

Accordingly, it is an object of the present invention to provide an improved seal assembly, particularly a sanitary seal, which overcomes the disadvantages of the prior known seal assemblies and is able to successfully overcome or at least minimize the two above-mentioned problems. Specifically, it is an object of the present invention to provide:

1. An improved sanitary seal assembly which can be easily disassembled, cleaned and reassembled.
2. An improved seal assembly, as aforesaid, which is of the cartridge-type so as to enable the seal to be disassembled and reassembled substantially as a unit.
3. An improved seal assembly, as aforesaid, which substantially eliminates sharp corners and/or recesses wherein material and/or bacteria can collect, whereby the seal is thus substantially self-cleaning.
4. An improved seal assembly, as aforesaid, which can be operated for longer periods of time without requiring shut down of the equipment with which it is associated for cleaning purposes.
5. An improved seal assembly, as aforesaid, on which some cleaning operations, at least between the sealing faces, can be carried out during operations.
6. An improved seal assembly, as aforesaid, which can be easily and economically manufactured, which is dependable and efficient in operation, and which meets normal sanitary requirements.

Other objects and purposes of the invention will be apparent to persons acquainted with devices of this general type upon reading the following specification and inspecting the accompanying drawings.

BRIEF DESCRIPTION OF THE DRAWINGS

FIG. 1 is a central sectional view of the improved sanitary seal construction according to the present invention.

FIG. 2 is a fragmentary sectional view taken along the line II—II of FIG. 1.

FIG. 3 is a fragmentary sectional view taken along the line III—III of FIG. 1.

FIG. 4 is a fragmentary sectional view taken along the line IV—IV of FIG. 1.

Certain terminology will be used in the following description for convenience in reference only and will not be limiting. The words "upwardly", "downwardly", "leftwardly" and "rightwardly" will refer to directions in the drawings to which reference is made. The words "inwardly" and "outwardly" will refer to directions toward and away from, respectively, the geometric center of the device and designated parts thereof. The word "inwardly" will specifically refer to the direction toward the inside of the housing, being the rightward direction in FIG. 1, where "outwardly" will refer to the direction exteriorly of the housing, being the leftward direction in FIG. 1. Said terminology will include the words above specifically mentioned, derivatives thereof and words of similar import.

SUMMARY OF THE INVENTION

The objects and purposes of the present invention are met by providing the seal construction which is dosposed between a rotatable shaft and a surrounding housing, the shaft extending outwardly from the housing through a removable housing portion. The seal construction includes an insert or stationary seal member mounted on the removable housing portion and encircling the shaft, the insert being keyed to the housing by means of a pin-and-groove connection. The groove is formed in the insert and is provided with a smoothly curved surface. The insert has a seal face which seals against a further seal face provided on a rotatable seal unit which comprises a rotatable seal ring which also encircles the shaft, same being mounted for floating movement relative to the shaft. The rotatable seal ring is interconnected, as by a plurality of drive pins, to a collar which is fixedly secured to the shaft by means of a pin-and-slot connection, the slot again being defined by a smooth or continuous surface free of sharp edges or corners. The drive pins, which axially secure the rotatable seal ring to the collar, extend through grooves in the collar and have enlarged head portions for preventing axial separation of the seal ring and the collar. A resilient spring is confined between the rotatable seal ring and the collar for urging the rotatable seal ring into sealing engagement with the insert. The seal construction can be cleaned by removing the removable housing portion, whereupon the insert can likewise be removed from the shaft, with the rotatable seal unit then also being removed as a unit. The overall seal construction can easily be reassembled on the shaft in the reverse manner.

Cleansing of the seal construction is further assisted by means of a cleaning fluid, particularly steam, which during manual operation of the seal may be supplied to a closed chamber defined between the external surface of the shaft and the internal peripheries of the insert and rotatable seal ring, whereupon the steam then flows radially outwardly between the abutting seal faces for both cleaning, cooling and lubricating same.

DETAILED DESCRIPTION

FIG. 1 illustrates therein an improved sanitary seal assembly 11 constructed according to the present invention, which seal assembly 11 is disposed for sealingly coacting between a rotatable shaft 12 and a surrounding housing 13. The housing 13 includes a removable cover plate 14 which is secured to the housing in any suitable manner, such as by screws 16. The cover plate 14 has an opening 17 through which extends the rotatable shaft 12.

The seal assembly 11 includes an insert or stationary seal ring 21 having a sleeve portion 22 disposed within the housing opening 17 and encircling the shaft 12. The seal ring 21 includes an annular flange 23 disposed adjacent and in abutting engagement with the inner surface of the cover plate 14. The flange 23 is provided with an axial slot 24 extending therethrough, the bottom surface 26 of which is rounded so that the slot is free of sharp edges or corners. A pin 27 is fixedly secured to the cover plate 14 and extends rearwardly into the slot 24 for nonrotatably relating the insert 21 to the cover plate 14. Other construction details of the insert 21 will be described hereinafter.

The insert 21, which is preferably constructed of carbon, is provided with a transverse annular seal face 28 on the inner axial end thereof, which seal face 28 is adapted to be maintained in abutting sealing engagement with a further transverse annular seal face 29 as provided on the adjacent axial end of a rotatable seal ring 31.

The rotatable seal ring 31 includes a base wall portion 32 having an opening 33 therethrough, in which is positioned the rotatable shaft 12, the opening 33 being larger than the shaft 12 so as to enable the seal ring 31 to angularly float relative to the shaft 12 in a conventional manner so as to maintain the seal face 29 in firm abutting engagement with the seal face 28. The seal ring 31 also includes an annular flange 34 which extends axially inwardly from the base wall portion 32, the annular flange 34 encircling, and spaced radially outwardly from, the shaft 12. The flange 34 has an inner annular wall 36 which is spaced from the external surface of the shaft 12 so as to define an annular recess 37 therebetween.

A conventional compression spring is disposed within the annular recess 37 in surrounding relationship to the shaft 12, the one end (leftward end in FIG. 1) of the spring 38 being disposed in abutting engagement with a conventional elastomeric seal ring 39, preferably an O-ring. The seal ring 39 is disposed so as to sealingly abut the rear face 41 of the base wall portion 32 and, when deformed, will also sealingly engage the external periphery of the shaft 12. The rear wall 41 and the inner annular wall 36 are joined by a rounded corner surface 42, which surface 42 is preferably formed with a radius substantially equal to the radius of the O-ring 39 so that the O-ring will thus resiliently and snugly seat against the corner surface 42.

The other end (rightward end in FIG. 1) of the spring 38 is disposed in abutting engagement with the front face of an annular collar 44, whereupon the spring thus urges the collar 44 rearwardly into abutting engagement with a shoulder 46 formed on the shaft 12. The collar 44 is provided with an internal slot 47 extending axially thereof, which slot is also provided with a rounded surface 49 on the bottom thereof so that the slot 47 is thus free of sharp edges or corner. A pin 48 is fixedly secured to the shaft 12 and extends radially outwardly therefrom into the slot 47 so as to nonrotatably connect the collar 44 to the shaft 12. While the collar 44 is nonrotatable relative to the shaft 12, nevertheless the internal diameter of the collar is slightly greater than the external diameter of the shaft so as to enable the collar to be freely axially removed or mounted on the shaft, whereby the spring thus resiliently urges the collar against the shoulder 46.

The collar 44 is nonrotatably connected to the rotatable seal ring 31 by means of one or more axially extending drive pins 51, which pins 51 are fixedly secured to the seal ring 31 and extend axially rearwardly so as to engage the flange portion 52 of the collar 44. The flange portion 52 of the collar 44 is provided with one or more locking recesses 54 therein. The recess 54 accommodates therein the main body of the pin 51 with the enlarged head 56 of the pin being disposed on the rearward side of the flange as illustrated in FIG. 1.

The locking recess 54, as illustrated in FIG. 2, specifically includes a radial slot portion 57 which has a width slightly greater than the diameter of the head 56 so as to enable the head to freely pass axially therethrough. The radial slot portion 57 is also provided with a rounded surface 58 on the bottom thereof so that the slot 57 is free of sharp edges or corners. The locking recess 54 also includes a transverse slot 59 which extends circumferentially or laterally relative to the radial slot 57. The transverse slot 59 has a width slightly greater than the diameter of the pin 51 so as to accommodate the main pin body therein, while at the same time the width of the slot 59 is less than the diameter of the head 56 so as to prevent axial separation between the collar 44 and the rotatable seal ring 31 when the pin is disposed within the transverse slot 59.

The seal assembly 11 also preferably includes means for continuously cleaning the seal faces 28 and 29 during operation of the seal assembly. Particularly, there is provided a source 61 of cleaning fluid, preferably steam. The source 61 is connected by means of intermediate conduits 62 to a pair of diametrically opposite ports 63 which are formed in the cover plate 14. The ports 63 in turn communicate with a pair of radial passageways 64 which extend through the stationary seal ring 21 and communicate with an annular chamber 66 which is defined between the outer surface of the shaft 12 and the inner peripheries of the seal rings 21 and 31.

The chamber 66 is in part defined by means of an annular groove 67 formed in the periphery of the shaft 12 adjacent the ports 64. The chamber additionally includes an annular clearance space 68 defined between the shaft 12 and stationary seal ring 21 and a further annular clearance space 69 as defined between the shaft 12 and the rotatable seal ring 31. The one end of the annular chamber 66 is closed by means of the resilient O-ring 39, whereas the other axial end of the chamber 66 is closed by means of a further resilient elastomeric seal ring 71 which is positioned within a groove 72 formed within the periphery of the shaft 12 and is disposed in rotatable sealing engagement with the inner periphery of the stationary seal ring 21. The resilient ring 71 is, as illustrated in FIG. 1, positioned closely adjacent, but axially outwardly from, the inner ends of the radial ports 64.

There is additionally provided a further pair of resilient elastomeric seal rings 73 and 74, which seal rings are disposed in grooves formed on the external periphery of the stationary seal ring 21 and sealingly engage the wall 17. The seal rings 73 and 74 are disposed on opposite axial sides of the ports 63 and 64 so as to prevent the escape of the steam supplied to the chamber 66.

ASSEMBLY AND OPERATION

The operation of the seal assembly 11 will be briefly described to insure a complete understanding thereof.

When the shaft 12 is rotating relative to the housing 13, the rotation of the shaft causes a corresponding rotation of the collar 44 and the rotatable seal ring 31. Since spring 38 resiliently urges the rotatable seal ring 31 axially toward the stationary seal ring 21, the seal face 29 is resiliently urged into rotatable sliding bearing engagement with the seal face 28. Due to the permissible floating movement of the seal ring 31, it will remain in flush bearing engagement with the seal ring 21 irrespective of slight misalignment or irregularities between the shaft 12 and the housing 13. Any tendency for fluid to escape from the housing is substantially prevented by the seal assembly 11 due to the sealing engagement created by the resilient seal rings 73, 74 and 39, and additionally due to the sealing engagement between the seal faces 28 and 29.

To assist in maintaining the seal faces 28 and 29 in a clean or sanitary condition a cleaning fluid, such as steam, is preferably supplied from the source 61 through conduits 62 into the ports 63, whereupon the fluid flows through passages 64 into the annular chamber 66 and thence radially outwardly between the seal faces 28 and 29. The radial outward flow of the cleaning fluid between the seal faces 28 and 29 thus maintain the seal faces in a clean and sanitary condition. The flow of cleaning fluid between the seal faces 28 and 29 also assists in maintaining the seal faces at a substantially uniform temperature and additionally functions as a lubricant for the seal faces.

During operation of the seal assembly, there is little tendency for material or bacteria to collect on the seal assembly since all of the grooves or recesses 24, 47 and 54 are provided with smooth and continuous surfaces which are free of sharp or dead corners. This configuration makes it difficult for material to collect and thus the seal assembly is partially self-cleaning and, accordingly, remains in a clean and sanitary condition for a substantially longer period of time than conventional seal assemblies.

When it is desired to remove the seal assembly 11 for cleaning purposes, the cover plate 14 is first removed from the housing 13, whereupon the stationary seal ring 21 can the be removed from the shaft 12 or at least moved axially (leftwardly in FIG. 1) away from the housing 13.

The seal ring 21 is thus more accessible for cleaning purposes.

After the stationary seal ring 21 has been removed or displaced axially leftwardly on the shaft 12, the rotating seal ring can also be removed or displaced axially leftwardly on the shaft for cleaning purposes. Particularly, since the rotating seal ring 31 and collar 44 are axially interconnected by means of the drive pins 51, this subassembly can be completely removed or displaced axially as a unit inasmuch as the heads 56 of the drive pins 51 prevent complete axial separation of the rotating seal ring 31 from the collar 44 when in the position illustrated in FIG. 2. Thus, this subassembly can be removed as a unit into a more accessible position, whereupon the rotating seal ring 31 can then be angularly displaced relative to the collar 44 until the drive pins 51 are moved from the transverse slots 59 into the radial slots 57, the heads 56 thus passing freely through the radial slots 57 to permit complete axial separation of the seal ring 31 and the collar 44. This thus permits all of the individual members to be completely cleaned.

After all of the individual components of the seal assembly have been cleaned, then the seal assembly is reassembled in the reverse manner as explained above.

While the rotating seal ring 31 and the collar 44 can be assembled or disassembled as a unit as explained above, it is also possible that these members could be individually assembled or disassembled. For example, during disassembly, the rotating seal ring 31 can, if desired, be initially angularly displaced so as to move drive pin 51 into radial slot 57, whereupon the rotating seal ring 31 would be individually removable from the shaft 12, with the collar 44 likewise being individually axially removable from the shaft. The manner in which the drive pins 51 and the locking recesses 54 cooperate thus permit the rotating seal ring 31 and the collar 44 to be assembled or disassembled either as a unit or individually, depending upon whatever is most convenient under the specific operating conditions encountered.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. A mechanical seal construction for use between a wall and a shaft rotatable relative to said wall and extending through an opening therein, said seal construction comprising:
   first seal means including a first annular seal member fixable with respect to said wall, said first seal member including a sleeve portion sealingly disposed within said opening in surrounding relationship to said shaft and having a first annular seal face thereon substantially transverse to the axis of said shaft;
   second seal means affixable to said shaft for rotation therewith, said second seal means including a second annular seal member disposed in surrounding relationship to said shaft and mounted for at least limited floating movement relative to said shaft, said second seal member having a second annular seal face thereon substantially transverse to the axis of said shaft and disposed adjacent to and directly opposite said first seal face;
   said second seal means further including an annular collar nonrotatably affixable to said shaft;
   said second seal means also including coupling means coacting between said second seal member and said collar
   1. for transmitting torque from said collar to said second seal member for rotating same with said shaft in response to rotation in one direction,
   2. for normally preventing said collar and said second seal member from being axially disconnected while permitting limited relative axial movement therebetween, and
   3. for permitting said collar and said second seal member to be axially disconnected in response to relative rotation therebetween in the opposite direction;
   said second seal means still further including spring means disposed between said second seal member and said collar in surrounding relationship to said shaft for normally resiliently urging said second seal face into rotatable sliding sealing contact with said first seal face; and
   means for cleaning said first and second seal faces when disposed in rotatable sliding sealing contact with one another, said cleaning means including a closed annular chamber between said shaft and said first and second seal members, said chamber communicating with the inner edges of said seal faces and means for supplying cleaning fluid to said chamber, whereby said cleaning fluid will flow radially outwardly between said first and second seal faces for cleaning same.

2. A seal construction according to claim 1, in which said coupling means includes a drive pin extending axially between said collar and said second seal member, said drive pin having one end thereof fixedly secured to one of said collar and said second seal member, the other end of said drive pin being slidably received within and extending through a recess formed within the other of said collar and said second seal member, the other end of said drive pin having a radially enlarged head portion fixedly secured thereto, and said recess including a first slot portion having a width large enough to axially accommodate therein the head portion of said drive pin, and said recess further including a second slot portion communicating with said first slot portion and having a width large enough to slidably accommodate therein the main body portion of said drive pin but smaller than said head portion, whereby said collar and said second seal member are axially connected together by said drive pin when same is disposed in said second slot portion while said drive pin still permits limited relative axial movement therebetween.

3. A seal construction according to claim 2, in which said first slot portion opens in a radial direction, and said second slot portion extending transversely of said radial direction.

4. A seal construction according to claim 2, in which the one end of said drive pin is fixedly connected to said second seal member, and wherein said recess is formed within said collar, and the head portion of said pin is disposed adjacent the axial side of said collar opposite from said second seal member, said second seal member and said collar being axially disconnected by relative rotation therebetween so as to angularly displace said drive pin into said first slot portion for enabling said head portion to freely axially move through said first slot portion.

5. A seal construction according to claim 2, in which a pin-and-slot connection is provided between said collar and said shaft for nonrotatably affixing said collar to said shaft, said pin-and-slot connection including a pin fixedly secured to said shaft and extending radially beyond the periphery thereof, and a slot extending axially of said collar and extending inwardly from the inner radial periphery thereof, the pin on said shaft extending into the slot in said collar for nonrotatably relating said collar to said shaft, said slot on said collar being provided with a smooth surface free of sharp edges or corners for preventing collection of bacteria or the like, and the slot portions of said recess also being formed with smooth surfaces which are free of sharp edges or corners so as to also prevent the collection of bacteria or the like.

6. A seal construction according to claim 5, wherein said housing includes a removable housing cover having said opening therein, and a second pin-and-slot connection coacting between said removable cover and said first seal member for nonrotatably interconnecting same, said second pin-and-slot connection including a second pin fixedly secured to and extending inwardly from said cover and a second slot extending axially through a portion of said first seal member adjacent the outer periphery thereof with said second pin extending into said second slot, said second slot being formed with a smooth surface free of sharp edges or corners for preventing the collection therein of bacteria or the like.

7. A seal construction according to claim 1, wherein said cleaning means includes a port formed in said housing with the outer end of said port being connected to a source of pressurized cleaning fluid, the inner end of said port terminating adjacent said first seal member, and said first seal member including a passage extending radially therethrough with the outer end of said passage communicating with the inner end of said port and the inner end of said passage communicating with said annular chamber, a first resilient elastomeric seal ring disposed between and sealingly engaging said first seal member and said shaft for sealingly closing one axial end of said annular chamber, and a second resilient elastomeric seal ring disposed between and sealingly engaging said second seal member and said shaft for sealingly closing the other axial end of said annular chamber.

8. A seal construction according to claim 7, wherein said spring means includes a compression spring having one end thereof coacting with said second elastomeric seal ring for resiliently urging said second seal ring into sealingly engagement with a rounded shoulder formed on said second seal member.

9. A seal construction according to claim 8, in which said coupling means includes an axially extending drive pin extending between said collar and said second seal member, said drive pin having one end thereof fixedly secured to one of said collar and said second seal member, the other end of said drive pin being slidably received within and extending through a recess formed within the other of said collar and said second seal member, the other end of said drive pin having a radially enlarged head portion fixedly secured thereto, and said recess including a radially directed slot portion having a width large enough to axially accommodate therein the head portion of said drive pin, and said recess further including a transversely extending slot portion communicating with said radially directed slot portion and having a width large enough to slidably accommodate therein the main body portion of said drive pin but smaller than said head portion, whereby said collar and said second seal member are axially connected together by said drive pin when same is disposed in said transverse slot portion while said drive pin still permits limited relative axial movement therebetween.

10. A seal construction according to claim 9, wherein said one end of said drive pin is fixedly connected to said second seal member, wherein said recess is formed within said collar, the head portion of said pin being disposed adjacent the axial side of said collar opposite from said second seal member, said second seal member and said collar being axially disconnected by relative rotation therebetween so as to angularly displace said drive pin into said radially directed slot portion for enabling said head portion to freely axially move through said radial slot portion, wherein a first pin-and-slot connection is provided between said collar and said shaft for nonrotatably affixing said collar to said shaft, said first pin-and-slot connection including a first pin fixedly secured to said shaft and extending radially beyond the periphery thereof, and a first slot extending axially of said collar and extending inwardly from the inner radial periphery thereof, said first pin extending into said first slot for nonrotatably affixing said collar to said shaft, wherein said housing includes a removable housing cover having said opening therein, and a second pin-and-slot connection coacting between said removable cover and said first seal member for nonrotatably interconnecting same, said second pin-and-slot connection including a second pin fixedly secured to and extending inwardly from said cover, and a second slot extending axially through a portion of said first seal member adjacent the outer periphery thereof with said second pin extending into said second slot, said first and second slots and said recess being formed with smooth surfaces free of sharp edges or corners for preventing the collection therein of bacteria or the like.

* * * * *